| United States Patent [19]
Christman | [11] Patent Number: 4,555,531 |
| --- | --- |
| | [45] Date of Patent: Nov. 26, 1985 |

[54] RIGID POLYURETHANE FOAMS EMPLOYING ALKYLENE OXIDE ADDUCTS OF ALKANOLAMINES

[75] Inventor: Donald L. Christman, Grosse Ile, Mich.

[73] Assignee: BASF Wyandotte Corporation, Wyandotte, Mich.

[21] Appl. No.: 691,479

[22] Filed: Jan. 14, 1985

[51] Int. Cl.$^4$ ............................................. C08G 18/14
[52] U.S. Cl. ..................................... 521/167; 521/914
[58] Field of Search ................................ 521/167, 914

[56] References Cited

U.S. PATENT DOCUMENTS

| 3,890,255 | 6/1975 | van Leuwen et al. | 521/167 |
| 4,374,209 | 2/1983 | Rowlands | 521/164 |
| 4,434,277 | 2/1984 | Kozawa et al. | 528/99 |
| 4,438,235 | 3/1984 | Brizgys | 524/786 |

*Primary Examiner*—Maurice J. Welsh
*Attorney, Agent, or Firm*—Norbert M. Lisicki

[57] ABSTRACT

The invention relates to rigid polyurethane foams prepared by reacting a polyether polyol other than one derived from an alkanolamine, an alkylene oxide adduct of an alkanolamine, catalyst and blowing agent, and an organic polyisocyanate. The compositions are useful as insulation.

10 Claims, No Drawings

RIGID POLYURETHANE FOAMS EMPLOYING ALKYLENE OXIDE ADDUCTS OF ALKANOLAMINES

BACKGROUND OF THE INVENTION

1. Field of the Invention

This invention pertains to rigid polyurethane foams containing alkylene oxide adducts of alkanolamines.

2. Description of the Prior Art

U.S. Pat. No. 4,438,235 teaches the use of tertiary alkanolamines for the preparation of non-cellular polyurethanes. U.S. Pat. No. 4,434,277 teaches the preparation of polyurethanes employing the reaction product of an aldehyde, phenol, and alkanolamine. U.S. Pat. No. 4,374,209 teaches the preparation of a polymer-modified polyol wherein an alkanolamine is polymerized with an organic polyisocyanate in the presence of a polyol.

This application relates to rigid polyurethane foams which have good K-factor properties and low smoke density properties. The foams are prepared by mixing a polyoxyalkylene polyether polyol other than one derived from an alkanolamine with an alkylene oxide adduct of an alkanolamine. The mixture is reacted with an organic polyisocyanate to form the polyurethane foam. The prior art does not disclose this combination of ingredients or the significance of the combination.

SUMMARY OF THE INVENTION

Low K-factor and low smoke density property polyurethane foams are prepared by (a) mixing a polyoxyalkylene polyether polyol other than one derived from an alkanolamide, (b) an alkylene oxide adduct of an alkanolamine, (c) catalyst and blowing agent, and (d) reacting the mixture with an organic polyisocyanate.

DESCRIPTION OF THE PREFERRED EMBODIMENTS

The rigid polyurethane foams which are the subject matter of this invention are prepared by reacting a mixture of (a) a polyoxyalkylene polyether other than one derived from an alkanolamine, (b) an ethylene oxide, propylene oxide adduct of an alkanolamine having a molecular weight range from about 200 to about 500, containing an amount of ethylene oxide from about 20 weight percent to about 96 weight percent, (c) catalyst, surfactant, blowing agent, and (d) an organic polyisocyanate.

The ratio of polyether polyol to the adduct of alkanolamine is from 2.5:1 to about 1:1.5, preferably 1:1.

The polyoxyalkylene polyether polyol or polyether blend which are employed in the subject invention are well known in the art and are generally referred to as polyoxyalkylene polyether polyols. These polyols are prepared by the reaction of an alkylene oxide with a polyhydric compound. Alkylene oxides which may be employed in the preparation of the polyols of the present invention include ethylene oxide, propylene oxide, the isomeric normal butylene oxides, hexylene oxide, octylene oxide, dodecene oxide, methoxy and other alkoxy propylene oxides, and cyclohexene oxide. Styrene oxide may also be employed. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

The polyoxyalkylene polyether polyols may have either primary or secondary hydroxyl groups and preferably are prepared from alkylene oxides having from 2 to 8 carbon atoms and may have molecular weights from about 400 to about 10,000. The polyoxyalkylene polyether glycol may be prepared by any known process such as, for example, the process disclosed by Wurtz in 1859 and *Encyclopedia of Chemical Technology*, Vol. 7, pages 257–262, published by Interscience Publishers, Inc. (1951) or in U.S. Pat. No. 1,922,459.

Polyhydric compounds which may be reacted with the alkylene oxides to prepare the polyalkylene ether polyols employed in the subject invention include ethylene glycol, propylene glycol, diethylene glycol, dipropylene glycol, the isomeric butylene glycols, 1,5-pentane diol, 1,6-hexanediol, glycerol, trimethylolpropane, 1,2,6-hexanetriol, pentaerythritol, sorbitol, sucrose and alpha-methyl glycoside.

The alkylene oxide adduct of the alkanolamine is prepared by reacting ethylene oxide and propylene oxide with the alkanolamine, preferably in the presence of an alkaline catalyst. This catalyst may be potassium hydroxide, sodium hydroxide, sodium and potassium methylate and other catalyst well known to those skilled in the art. The quantity of ethylene and propylene oxide employed is such that the molecular weight of the adduct may vary from about 200 to about 500. The ethylene oxide content may range from about 20 percent to about 96 percent based on the total weight of the adduct.

Any suitable alkanolamine or combination of alkanolamines may be used. These include monoethanolamine, diethanolamine, triethanolamine, methylethanolamine, ethylethanolamine, butylethanolamine, the methyl-, ethyl-, butylethanolamine, the methyl-, ethyl-, butyldiethanolamines, monoisopropanolamine, diisopropanolamine, and triisopropanolamine. Preferred are monoethanolamine, diethanolamine and triethanolamine.

The mixture of polyoxyalkylene polyether polyol and alkanolamine adduct is reacted with an organic polyisocyanate such that the ratio of isocyanate groups of the polyisocyanate to the hydroxyl groups of the polyether polyol is 1.0:1 to 1.3:1. Polyisocyanates which may be used include aromatic, aliphatic, and cycloaliphatic polyisocyanates and combinations thereof. Representative examples are diisocyanates such a m-phenylene diisocyanate, 2,4-toluenediisocyanate, 2,6-toluenediisocyanate, mixtures of 2,4-toluenediisocyanate and 2,6-toluenediisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-4,4'-diphenylmethane diisocyanate; the triisocyanates such as 4,4'4''-triphenylmethane triisocyanate, polymethylene polyphenylene polyisocyanate and 2,4,6-toluene triisocyanate; and the tetraisocyanates such as 4,4'-dimethyl-2,2',5,6'-diphenylmethane tetraisocyanate. Especially useful due to their availability and properties are toluene diisocyanate, 4,4'-diphenylmethane diisocyanate and polymethylene polyphenylene polyisocyanate. Polymethylene polyphenylene polyisocyanate, which is most preferred, is a product which results from the phosgenation of an aniline-formaldehyde condensation product; it is sometimes called "crude MDI."

As was previously mentioned, catalysts may be used to increase the reaction rate. If catalysts are used, they are added to the mixture of the polyether polyol and alkanolamine adduct blend and inorganic filler before the reaction of the mixture with the polyisocyanate.

Urethane catalysts which may be employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, N-ethylmorpholine and diethylethanolamine may also be employed as well as mixtures of any of the above. Generally, the amount of urethane-promoting catalyst employed will be from 0.01 percent to 10 percent by weight based on the weight of the polyether polyol.

The polyurethane foams employed in the present invention are generally prepared in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

A surface-active agent is generally necessary for production of high grade polyurethane foam according to the present invention, since in the absence of same, the foams collapse or contain very large uneven cells. Numerous surface-active agents have been found satisfactory. Nonionic surface-active and wetting agents are preferred. Of these, the nonionic surface-active agents prepared by the sequential addition of propylene oxide and then ethylene oxide to propylene glycol and the solid or liquid organo-silicones have been found particularly desirable. Other surface-active agents which are operative, although not preferred, include polyethylene glycol ethers of long chain alcohols, tertiary amine or alkanolamine salts of long chain alkylacid sulfate esters, alkyl sulfonic esters, and alkyl arysulfonic acids.

The properties of the rigid polyurethane foams in the examples which follow were determined by the following ASTM test methods:

|  | Test Method |
| --- | --- |
| K-Factor | ASTM C-518 |
| NBS Smoke Density | ASTM E-662-79 |

The following examples illustrate the nature of the invention.

Polyol A is an propylene oxide ethylene oxide adduct of a mixture of sucrose and propylene glycol and having a hydroxyl number of about 509.

Polyol B is propylene oxide, ethylene oxide adduct of toluenediamine containing 65.7 percent ethylene oxide and having a hydroxyl number of about 443.

Polyol C is a propylene oxide-ethylene oxide adduct of monoethanolamine containing 48.7 percent ethylene oxide and having a hydroxyl number of about 490.

Polyol D is a propylene oxide-ethylene oxide adduct of monoethanolamine containing 19.5 percent ethylene oxide and having a hydroxyl number of about 501.

Polyol E is a propylene oxide-ethylene oxide adduct of monoethanolamine containing 43.3 percent ethylene oxide and having a hydroxyl number of about 496.

Polyol F is a propylene oxide-ethylene oxide adduct of monoethanolamine containing 26.0 percent ethylene oxide and having a hydroxyl number of about 507.

Polyol G is a propylene oxide-ethylene oxide adduct of diethanolamine containing 43.3 percent ethylene oxide and having a hydroxyl number of about 502.

Polyol H is a propylene oxide-ethylene oxide adduct of diethanolamine containing 60.5 percent ethylene oxide and having a hydroxyl number of about 501.

Polyol I is a propylene oxide-ethylene oxide adduct of diethanolamine containing 77.7 percent ethylene oxide and having a hydroxyl number of about 505.

Polyol J is a propylene oxide-ethylene oxide adduct of diethanolamine containing 66.8 percent ethylene oxide and having a hydroxyl number of about 505.

Polyol K is a propylene oxide-ethylene oxide adduct of triethanolamine containing 39.8 percent ethylene oxide and having a hydroxyl number of about 508.

Polyol L is a propylene oxide-ethylene oxide adduct of monoethanolamine containing 39.2 percent ethylene oxide and having a hydroxyl number of about 507.

Polyol M is a propylene oxide-ethylene oxide adduct of monoethanolamine containing 51.6 percent ethylene oxide and having a hydroxyl number of about 498.

Polyol N is an ethylene oxide-ethylene oxide adduct of monoethanolamine containing 61.1 percent ethylene oxide and having a hydroxyl number of about 507.

Polyol O is a propylene oxide-ethylene oxide adduct of monoethanolamine containing 96.6 percent ethylene oxide and having a hydroxyl number of about 508.

Polyol P is a propylene oxide-ethylene oxide adduct of triethanolamine containing 59.6 percent ethylene oxide and having a hydroxyl number of about 504.

Polyol Q is a propylene oxide-ethylene oxide adduct of triethanolamine containing 79.5 percent ethylene oxide and having a hydroxyl number of about 502.

Polyol R is a propylene oxide-ethylene oxide adduct of monoethanolamine containing 60.4 percent ethylene oxide and having a hydroxyl number of 511.

Polyol S is a propylene oxide-ethylene oxide adduct of diethanolamine containing 46.2 percent ethylene oxide and having a hydroxyl number of 505.

Polyol T is propylene oxide-ethylene oxide adduct of diethanolamine containing 77.6 percent ethylene oxide and having a hydroxyl number of 519.

Isocyanate A is polyphenylene polymethylene polyisocyanate.

DC 193 is a silicone surfactant sold by Dow Corning Corporation.

Polycat 8 is an amine catalyst sold by Abbott Laboratories, Inc.

F-11A is trichloromonofluoromethane.

EXAMPLE 1–18

The polyurethane foams of Table I were prepared by charging a container with a suitable quantity of the reactants with the exception of the isocyanate as tabulated. The mixture was stirred for about 30 seconds and allowed to set until the air bubbles had dissipated. The calculated amount of polyisocyanate was added to the container, and the resulting mixture was stirred for about 35 seconds, and the foam was allowed to rise therein. After the foam rise was completed, the resulting foam was cured for about 48 hours at room temperature. The K-factors and smoke densities were then determined.

TABLE I

| Example Formulation, pbw | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Polyol | | | | | | | | | | | | | | | | | | |
| A | 60 | 60 | 60 | 60 | 60 | 60 | 60 | 60 | 60 | 60 | 60 | 60 | 60 | 60 | 60 | 60 | 60 | 60 |
| B | | | | | | 10 | 10 | | | 10 | | | | | | | | |
| C | 40 | | | | | | | | | | | | | | | | | |
| D | | 40 | | | | | | | | | | | | | | | | |
| E | | | 40 | | | | | | | | | | | | | | | |
| F | | | | 40 | | | | | | | | | | | | | | |
| G | | | | | 40 | | | | | | | | | | | | | |
| H | | | | | | 30 | | | | | | | | | | | | |
| I | | | | | | | 30 | | | | | | | | | | | |
| J | | | | | | | | 40 | | | | | | | | | | |
| K | | | | | | | | | 40 | | | | | | | | | |
| L | | | | | | | | | | 30 | | | | | | | | |
| M | | | | | | | | | | | 40 | | | | | | | |
| N | | | | | | | | | | | | 40 | | | | | | |
| 6.6% O | | | | | | | | | | | | | 40 | | | | | |
| P | | | | | | | | | | | | | | 40 | | | | |
| Q | | | | | | | | | | | | | | | 40 | | | |
| R | | | | | | | | | | | | | | | | 40 | | |
| S | | | | | | | | | | | | | | | | | 40 | |
| T | | | | | | | | | | | | | | | | | | 40 |
| DC-193 | 1.5 | | | | | | | | | | 1.5 | | | | | | | |
| Polycat 8 | 1.0 | | | | | | | | | | 1.0 | | | | | | | |
| F-11A | 38.9 | 39.0 | 39.0 | 39.2 | 39.1 | 39.1 | 38.9 | 39.1 | 39.2 | 39.2 | 39.0 | 39.2 | 39.0 | 39.1 | 39.1 | 39.2 | 39.1 | 39.4 |
| Isocyanate A | 127.6 | 127.3 | 127.3 | 128.4 | 127.9 | 127.8 | 127.1 | 128.2 | 128.5 | 128.4 | 127.5 | 128.5 | 127.5 | 128.1 | 127.9 | 128.8 | 128.2 | 129.6 |
| K-Factor | — | — | — | — | — | — | .140 | .139 | — | — | — | — | .135 | .142 | .144 | .143 | .141 | .145 |
| NBS-Smoke Density | 93 | 121 | 98 | 91 | 99 | 75 | 98 | 104 | 98 | 98 | 95 | 73 | 98 | — | — | — | — | — |

The embodiments of the invention in which an exclusive privilege or property is claimed are defined as follows:

1. A rigid polyurethane foam comprising the reaction product of
    (a) a polyoxyalkylene polyether polyol other than one derived from an alkanolamine,
    (b) an ethylene oxide-propylene oxide adduct of an alkanolamine having a molecular weight range from about 200 to about 500 and containing an amount of ethylene oxide from about 20 weight percent to about 96 weight percent,
    (c) catalyst, surfactant, blowing agent, and
    (d) an organic polyisocyanate.

2. The foam of claim 1 wherein the ratio of polyol to the adduct of alkanolamine is from about 2.5:1 to 1:1.5.

3. The foam of claim 1 wherein the ratio of polyol to the adduct of alkanolamine is from 2.5:1 to 1:1.

4. The foam of claim 1 wherein the adduct of the alkanolamine is selected from the group consisting of an adduct of ethanolamine, diethanolamine and triethanolamine.

5. The foam of claim 1 wherein the organic polyisocyanate is polymethylene polyphenylene polyisocyanate.

6. A process for preparing a rigid polyurethane foam comprising reacting
    (a) a polyoxyalkylene polyether polyol other than one derived from an alkanolamine,
    (b) an ethylene oxide-propylene oxide adduct of an alkanolamine having a molecular weight range from about 200 to about 500 and containing an amount of ethylene oxide from about 20 weight percent to about 96 weight percent,
    (c) catalyst, surfactant, blowing agent, and
    (d) an organic polyisocyanate.

7. The process of claim 6 wherein the ratio of polyol to the adduct of alkanolamine is from about 2.5:1 to 1:1.5.

8. The process of claim 6 wherein the ratio of polyol to the adduct of alkanolamine is from 2.5:1 to 1:1.

9. The process of claim 6 wherein the adduct of the alkanolamine is selected from the group consisting of an adduct of ethanolamine, diethanolamine and triethanolamine.

10. The process of claim 6 wherein the organic polyisocyanate is polymethylene polyphenylene polyisocyanate.

* * * * *